(12) United States Patent  
Lumezanu et al.

(10) Patent No.: US 9,413,646 B2  
(45) Date of Patent: Aug. 9, 2016

(54) PATH SELECTION IN HYBRID NETWORKS

(71) Applicant: NEC Laboratories America, Inc., Princeton, NJ (US)

(72) Inventors: Cristian Lumezanu, East Windsor, NJ (US); Cheng Jin, Princeton, NJ (US); Hui Zhang, Princeton Junction, NJ (US); Abhishek Sharma, Philadelphia, PA (US); Qiang Xu, East Windsor, NJ (US); Nipun Arora, Plainsboro, NJ (US); Guofei Jiang, Princeton, NJ (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 14/831,570

(22) Filed: Aug. 20, 2015

(65) Prior Publication Data

US 2016/0057054 A1 Feb. 25, 2016

Related U.S. Application Data

(60) Provisional application No. 62/041,600, filed on Aug. 25, 2014.

(51) Int. Cl.
*H04L 12/28* (2006.01)
*H04L 12/753* (2013.01)
*H04L 12/721* (2013.01)
*H04L 12/46* (2006.01)

(52) U.S. Cl.
CPC .............. *H04L 45/48* (2013.01); *H04L 12/462* (2013.01); *H04L 45/14* (2013.01)

(58) Field of Classification Search
CPC ........ H04L 45/48; H04L 45/14; H04L 12/462
See application file for complete search history.

(56) References Cited

U.S. PATENT DOCUMENTS

| | | | | |
|---|---|---|---|---|
| 7,961,636 | B1* | 6/2011 | Barach | H04L 12/4625 370/252 |
| 2012/0027017 | A1* | 2/2012 | Rai | H04L 12/18 370/392 |
| 2013/0121156 | A1* | 5/2013 | Rege | H04L 45/026 370/238 |
| 2013/0343228 | A1 | 12/2013 | Cohen | |
| 2014/0369209 | A1* | 12/2014 | Khurshid | H04L 41/0893 370/250 |
| 2015/0207699 | A1* | 7/2015 | Fargano | H04L 63/10 726/4 |

OTHER PUBLICATIONS

Agarwal, et al., "Traffic Engineering in Software Defined Networks", Proceedings IEEE INFOCOM, Apr. 2013, pp. 2211-2219.

Al-Fares, et al., "Hedera: Dynamic Flow Scheduling for Data Center Networks", NSDI'10 Proceedings of the 7th USENIX conference on Networked Systems Design and Implementation, Apr. 2010, 15 pages.

(Continued)

*Primary Examiner* — Clemence Han
(74) *Attorney, Agent, or Firm* — Joseph Kolodka

(57) ABSTRACT

Systems and methods for controlling legacy switch routing in one or more hybrid networks of interconnected computers and switches, including generating a network underlay for the one or more hybrid networks by generating a minimum spanning tree (MST) and a forwarding graph (FWG) over a physical network topology of the one or more hybrid networks, determining an optimal path between hosts on the FWG by optimizing an initial path with a minimum cost mapping, and adjusting the initial path to enforce the optimal path by generating and installing special packets in one or more programmable switches to trigger installation of forwarding rules for one or more legacy switches.

20 Claims, 5 Drawing Sheets

(56) References Cited

OTHER PUBLICATIONS

Al-Fares, et al., "A Scalable, Commodity Data Center Network Architecture", SIGCOMM, Aug. 2008, pp. 63-74.
Casado, et al., "Virtualizing the Network Forwarding Plane", ACM CoNEXT, Nov. 2010, pp. 1-6.
Chowdhury, et al. "Virtual Network Embedding with Coordinated Node and Link Mapping", INFOCOM 2009, IEEE Explore, Apr. 2009, 9 pages.
Drutskoy, et al., "Scalable Network Virtualization in Software-Defined Networks", IEEE Computer Internet Society,IEE Internet Computing, Mar. 2013, pp. 1-6.
Greenberg, et al., "VL2: A Scalable and Flexible Data Center Network", SIGCOMM, Aug. 2009, 12 pages.
Levin, et al. "Panopticon: Reaping the Benefits of Partial SDN Deployment in Enterprise Networks", 2014 USENIX Annual Technical Conference, Jun. 2014, pp. 1-16.
Lu, et al., HybNET: Network Manager for a Hybrid Network Infrastructure, Proceedings of the Industrial Track of the 13th ACM/IFIP/USENIX International Middleware Conference, Dec. 2013, 6 pages.
VMware, Network Virtualization in Multi-tenant Datacenters, International Computer Science Institute & UC Berkeley,Technical Report, Aug. 2013, pp. 1-22.
Sherwood, et al., "FlowVisor: A Network Virtualization Layer", OpenFlow Org., Oct. 2009, pp. 1-15.
Yu, et al., "Rethinking Virtual Network Embedding: Substrate Support for Path Splitting and Migration", Computer Communication Review Papers, Apr. 2008, 9 pages.
Murtaza Motiwala "An Architecture for Network Path Selection", Doctoral Dissertation, Georgia Institute of Technology, Atlanta, GA US Jun. 6, 2012, pp. 1-151, see pp. 46, 79-81, 113-120.

\* cited by examiner

PATH SELECTION IN HYBRID NETWORKS

RELATED APPLICATION INFORMATION

This application claims priority to provisional application No. 62/041,600 filed Aug. 25, 2014, the contents of which are incorporated herein by reference.

BACKGROUND OF THE INVENTION

1. Technical Field

The present invention relates generally to controlling switch routing in hybrid networks, and more particularly, to a system and method for controlling legacy and programmable switch routing in hybrid networks.

2. Description of the Related Art

Hybrid networks include both legacy and programmable (e.g., OpenFlow™) switches which improve network performance by employing software-defined networking (SDN) without requiring an upgrade of an entire network. Conventional systems and methods add SDN capabilities to switches at strategic places in a network and ensure that each flow traverses at least one such switch to achieve control of many SDN paradigms (e.g., routing, access control, etc.). however, the control points are limited to SDN-enabled devices, and operators cannot enforce fine-grained policies on the legacy paths between SDN switches.

SDN provides a logically-centralized interface to control and interact with network devices. Operators perform network management tasks (e.g., traffic engineering, access control, etc.) using programs executed from a centralized controller. The flexible control and expanded visibility offered by SDN may greatly reduce the cost of operating a network. However, fully benefitting from SDN conventionally requires a considerable initial investment, as network providers must conventionally upgrade or replace all legacy devices with programmable ones (e.g., ones whose forwarding tables are programmable remotely from a logically-centralized controller using a specialized protocol (e.g., OpenFlow™)).

Recently, attempts have been made to reduce capital expenditure of SDNs while maintaining most benefits of SDNs by upgrading only a few, strategically chosen devices in a network (e.g., hybrid network including programmable and legacy switches). However, although effective at controlling paths through SDN-enabled devices, conventional systems cannot dynamically affect the configuration of legacy switches and consequently, through the legacy network. Legacy network paths between two SDN switches are conventionally coarsely controlled using VLANs or tunnels, or simply left to the latitude of Layer 2 routing protocols (e.g., STP, ECMP, etc.).

A common way to determine paths in a legacy Layer 2 network is to have switches build a minimum spanning tree (MST) and then turn off the links that are not part of the spanning tree. The path between hosts is simply the path between them in the tree. However, relying on the network-computed spanning tree limits the diversity of paths available and unnecessarily extends many paths, thereby negatively affecting end-to-end performance. An original purpose of running MST is to avoid loops in a network. By default, when a switch sees a packet with unknown properties or when a switch receives a broadcast packet, it conventionally sends it on all interfaces (e.g., ports) except the incoming one. However, if the network topology includes loops, then packets may continually loop around indefinitely.

SUMMARY

A computer implemented method for controlling legacy switch routing in one or more hybrid networks of interconnected computers and switches, including generating a network underlay for the one or more hybrid networks by generating a minimum spanning tree (MST) and a forwarding graph (FWG) over a physical network topology of the one or more hybrid networks, determining an optimal path between hosts on the FWG by optimizing an initial path with a minimum cost mapping, and adjusting the initial path to enforce the optimal path by generating and installing special packets in one or more programmable switches to trigger installation of forwarding rules in one or more legacy switches.

A system for controlling legacy switch routing in one or more hybrid networks of interconnected computers and switches, including a network underlay generator for constructing a minimum spanning tree (MST) and a forwarding graph (FWG) over a physical network topology of the one or more hybrid networks, an optimizer for determining an optimal path between hosts on the FWG by optimizing an initial path with a minimum cost mapping, and a controller for enforcing the optimal path by generating and installing special packets in one or more programmable switches to trigger installation of forwarding rules in one or more legacy switches.

A computer-readable storage medium including a computer-readable program, wherein the computer-readable program when executed on a computer causes the computer to perform the steps of generating a network underlay for one or more hybrid networks of interconnected computers and switches by generating a minimum spanning tree (MST) and a forwarding graph (FWG) over a physical network topology of the one or more hybrid networks, determining an optimal path between hosts on the FWG by optimizing an initial path with a minimum cost mapping, and adjusting the initial path to enforce the optimal path by generating and installing special packets in one or more programmable switches to trigger installation of forwarding rules in one or more legacy switches.

These and other advantages of the invention will be apparent to those of ordinary skill in the art by reference to the following detailed description and the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
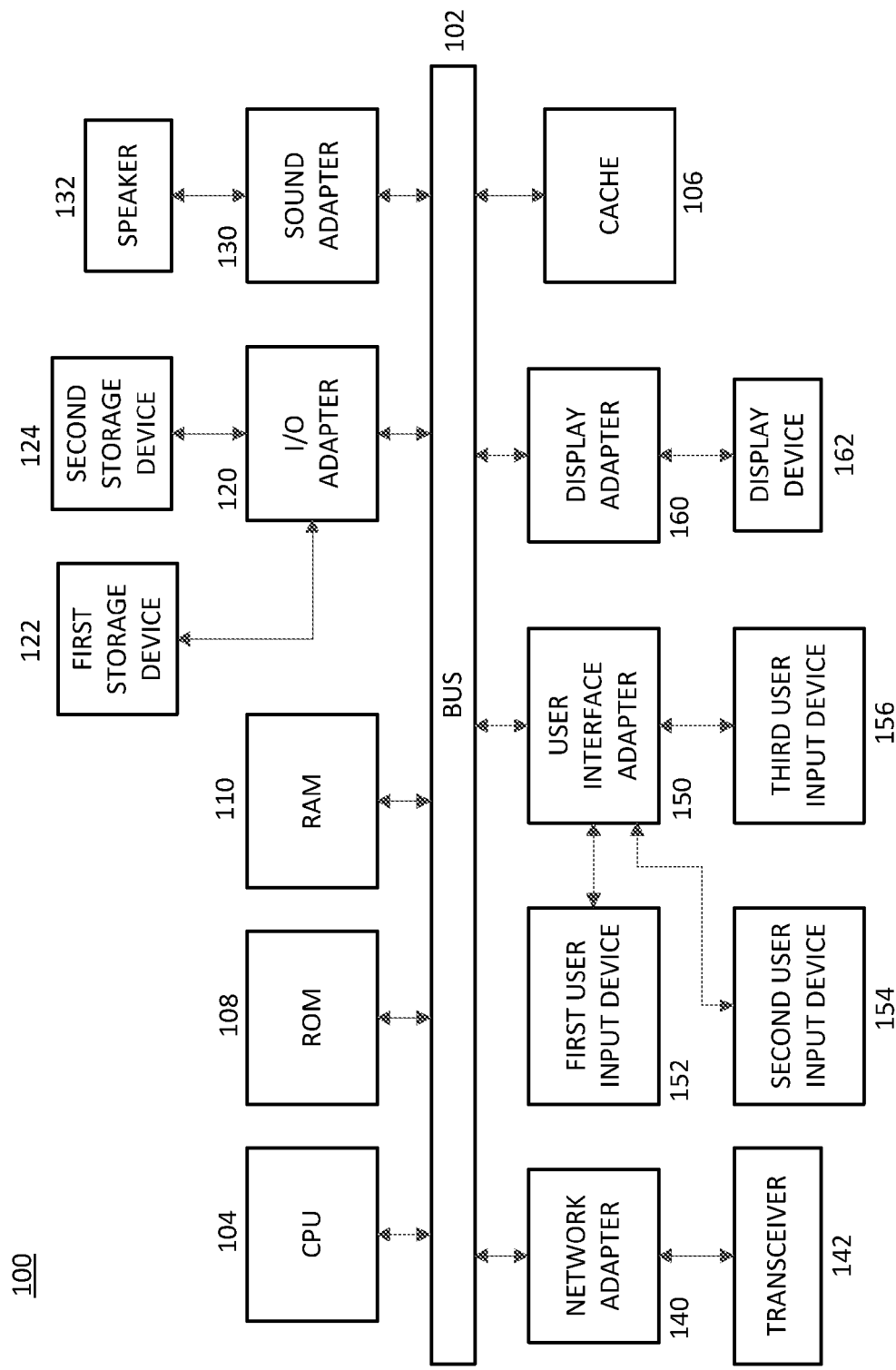
FIG. 1 shows an exemplary processing system to which the present principles may be applied, in accordance with an embodiment of the present principles.

The present principles are directed to systems and methods for controlling legacy and programmable (e.g., OpenFlow™)

switches in hybrid networks. In a particularly useful embodiment, the present principles may be employed to determine one or more minimum spanning trees (MSTs) and one or more forwarding graphs (FWGs) over a physical network topology that may be employed by one or more Virtual Terminal Networks (VTNs). A plurality of cost functions may be considered to determine the MST for each link, and the MST with the best benefit/cost ratio may be selected. To determine the FWG, the present principles may be employed by beginning with the generated MST and adding all links that are incident to a programmable (e.g., OpenFlow™) switch.

In an embodiment, optimization may be performed according to the present principles (e.g., using greedy shortest path, multi-commodity flow problem, random, etc. methods) on the FWG to determine optimal paths for the VTN. The determined paths may then be enforced/controlled by a controller by turning off all physical links that are not part of the FWG (e.g., using SNMP) and rules may be installed on one or more programmable (e.g., OpenFlow™) switches to drop broadcast traffic on all links that are part of the FWG but not the MST. Traffic may then be forwarded along determined paths according to various embodiments of the present principles.

The present principles may enhance one or more underlay graphs (used for computing paths between end-hosts) by leveraging capabilities of programmable switches to improve the performance and/or diversity of paths. In an embodiment, the system and method according to the present principles may adapt to the requirements of legacy networks and switches to avoid loops by keeping the FWG graphs loop free in the legacy portion of one or more networks. However, by outsourcing the computation of the spanning tree and FWGs to the application (and thus making them centralized rather than distributed), the present principles may be employed to determine a more accurate initial MST than conventional systems and methods at the beginning of the process according to various embodiments.

The present principles provide performance enhancements for tenants running on hybrid data center architectures according to various embodiments. More valued added services (e.g., that depend on the performance of the underlying network communications between the Virtual Machines (VMs) of one or more tenants) may be introduced using the present principles than are possible with conventional systems and methods. The present principles may further be employed to transition of data center networks from pure legacy to hybrid legacy and programmable switch networks (or pure programmable switch networks) more quickly and with lower computational cost than conventional systems and methods according to various embodiments.

In an embodiment, a network management framework may be employed for fine-grained routing control over legacy paths in hybrid SDNs using programmable switches according to the present principles. To update routing entries in legacy switches, the present principles may employ a simple primitive (e.g., LegacyFlowMod) according to various embodiments. When calling the simple primitive (e.g., LegacyFlowMod) with respect to a programmable switch (e.g., A), a legacy switch (e.g., B), a port on the legacy switch (e.g., p), and a mac address (e.g., m), the present principles may be employed to instruct a programmable switch to send a special packet (e.g., with m as the source MAC) to port p on the legacy switch. For illustrative purposes, it may be assumed that B runs MAC learning, and as such, it may update its forwarding entry for m. This enables remote manipulation of a forwarding entry on a legacy switch using programmable switches and MAC learning.

In an embodiment, the present principles may be employed to indirectly affect network routing by injecting fake and harmless information into the network. The present principles may function at layer 2 in hybrid SDN networks (e.g., including legacy and programmable switches), and may improve path diversity by providing highly fine-grained legacy path control according to various embodiments. In some embodiments, not all network paths may be enforced. For example, updating a forwarding entry for MAC m to port p may require that the switch be accessible on port p. For this, p may be directly connected to a programmable switch or be part of a layer 2 underlay that controls MAC-level routing (e.g., spanning tree). Given a path to update, the present principles may be employed to first check whether the update is possible for every switch on the path, and then attempts to perform the update.

In an embodiment, if there is no data traffic traversing an original path, the configuration may be updated to a new path using constant overhead (e.g., proportional to the number of legacy switches on the new path, but not necessarily the old path). Data traffic on the original path may override the path updates if not all switches on the new path are updated quickly enough, so in some embodiments, to ensure that an update is at least eventually applied, the rate of underlying traffic may be adapted to, and the rate of special packets may be adjusted accordingly according to the present principles.

In an embodiment, the present principles may be employed to remotely configure forwarding entries for legacy switch interfaces (e.g., which are reachable from an SDN switch in the same hybrid network). In some embodiments, based on a simple primitive (e.g., LegacyFlowMod), a hybrid network controller according to the present principles may enable more diversity and more fine-grained path control than conventional controllers for programmable switches (e.g., OpenFlow™) deployed in a hybrid network.

Before describing the present principles in detail, background regarding hybrid networks and path enforcement for ease of understanding various embodiments of the present principles. Hybrid networks may include both programmable switches and legacy (e.g., non-programmable switches), and provide a trade-off to network providers between the cost to deploy and the benefit derived from having a software-defined network. As network providers do not need to upgrade the entire network to add some programmable switches, providers may take advantage of the increased control and visibility provided by SDN without being cost prohibitive. However, the increased control in conventional systems is still limited only to the SDN-enabled (e.g., programmable) devices, and no existing hybrid networks currently provide a way to dynamically manage the configuration of legacy devices. Thus, legacy paths between SDN switches using conventional systems and methods must be manually set up (e.g., using VLANs), or left in the care of layer 2 protocols (e.g., STP).

A short overview of path enforcement in both legacy networks and software-defined networks (SDNs) is described below for ease of understanding of the present principles.

In legacy networks, standard layer 2 Ethernet switches may perform two main functions: learning (e.g., the next-hop switch toward a destination MAC address) and forwarding (e.g., a packet according to the learned information). To learn the next-hop switch for a packet, layer 2 switches broadcast the packet on all ports except the one on which the packet arrived. To prevent loops, the underlying topology may be restricted to a spanning tree by turning off (e.g., using STP) or aggregating (e.g., using link aggregation) multiple links.

In legacy networks, to learn the port on which to forward a packet with a specific MAC address, switches use MAC learning: if a packet with source address m arrives on port p they assume that any future packet with destination address can be delivered through p. The path of a packet may be static and may change only if there are topology or configuration changes in the network. To increase path diversity, operators can slice the network into multiple VLANs, each with its own spanning tree and set of forwarding entries. However, the use of spanning trees to prevent broadcast loops limits path selection flexibility (e.g., as feasible paths must include spanning tree links) and network performance (as paths may be much longer than necessary).

In Software-Defined Networks (SDNs), operators (or programs) may remotely modify their forwarding entries from a logically-centralized controller using a specialized protocol (e.g., OpenFlow™). Thus, switches may learn about unknown destinations and routing policies without requiring expensive broadcast or complex configurations. Unlike legacy networks, SDNs provide explicit and fast path control across the entire topology. If all switches in a network are programmable, SDN switches, explicit rules may be added in the switches to set up any path between hosts, thereby improving both path selection flexibility and network performance over legacy networks.

In hybrid networks, some of the advantages of SDNs (e.g., with respect to path selection and network performance) may be retained according to various embodiments of the present principles. For example, if a legacy switch in a network is replaced with a programmable switch, the present principles may be employed to control the programmable switch. In an embodiment, new paths may be determined and controlled from the programmable switches (or remotely), and the switch may be employed as a point of control in the network according to the present principles. In an embodiment, by adding another point of control into the network, optimal paths may be determined and controlled at the switch (or remotely). The paths may be fully controlled by controlling both programmable (e.g., OpenFlow™) and legacy switches on the paths using a specialized protocol (e.g., OpenFlow™) and learning functions in legacy switches to remotely configure forwarding entries on legacy switches according to an embodiment of the present principles.

It should be understood that embodiments described herein may be entirely hardware or may include both hardware and software elements, which includes but is not limited to firmware, resident software, microcode, etc. In a preferred embodiment, the present invention is implemented in hardware. The present invention may be a system, a method, and/or a computer program product. The computer program product may include a computer readable storage medium (or media) having computer readable program instructions thereon for causing a processor to carry out aspects of the present invention.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an exemplary processing system 100, to which the present principles may be applied, is illustratively depicted in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art.

These and other variations of the processing system 100 are readily contemplated by one of ordinary skill in the art given the teachings of the present principles provided herein.

Moreover, it is to be appreciated that systems 200, 400, 402, and 500 described below with respect to FIGS. 2, 4 and 5, respectively, are systems for implementing respective embodiments of the present principles. Part or all of processing system 100 may be implemented in one or more of the elements of systems 200, 400, 402, and 500.

Figure 2:
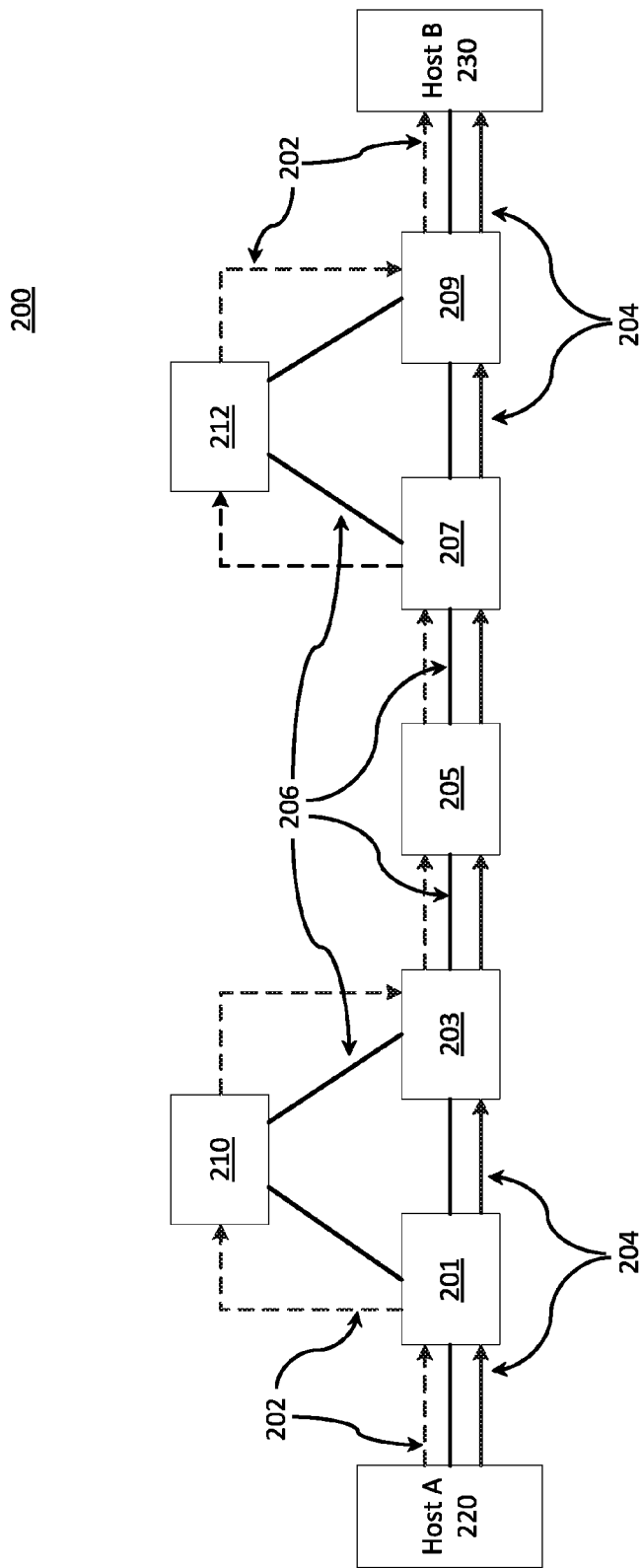
FIG. 2 shows an exemplary high level system/method for network path updating, in accordance with an embodiment of the present principles
Figure 3:
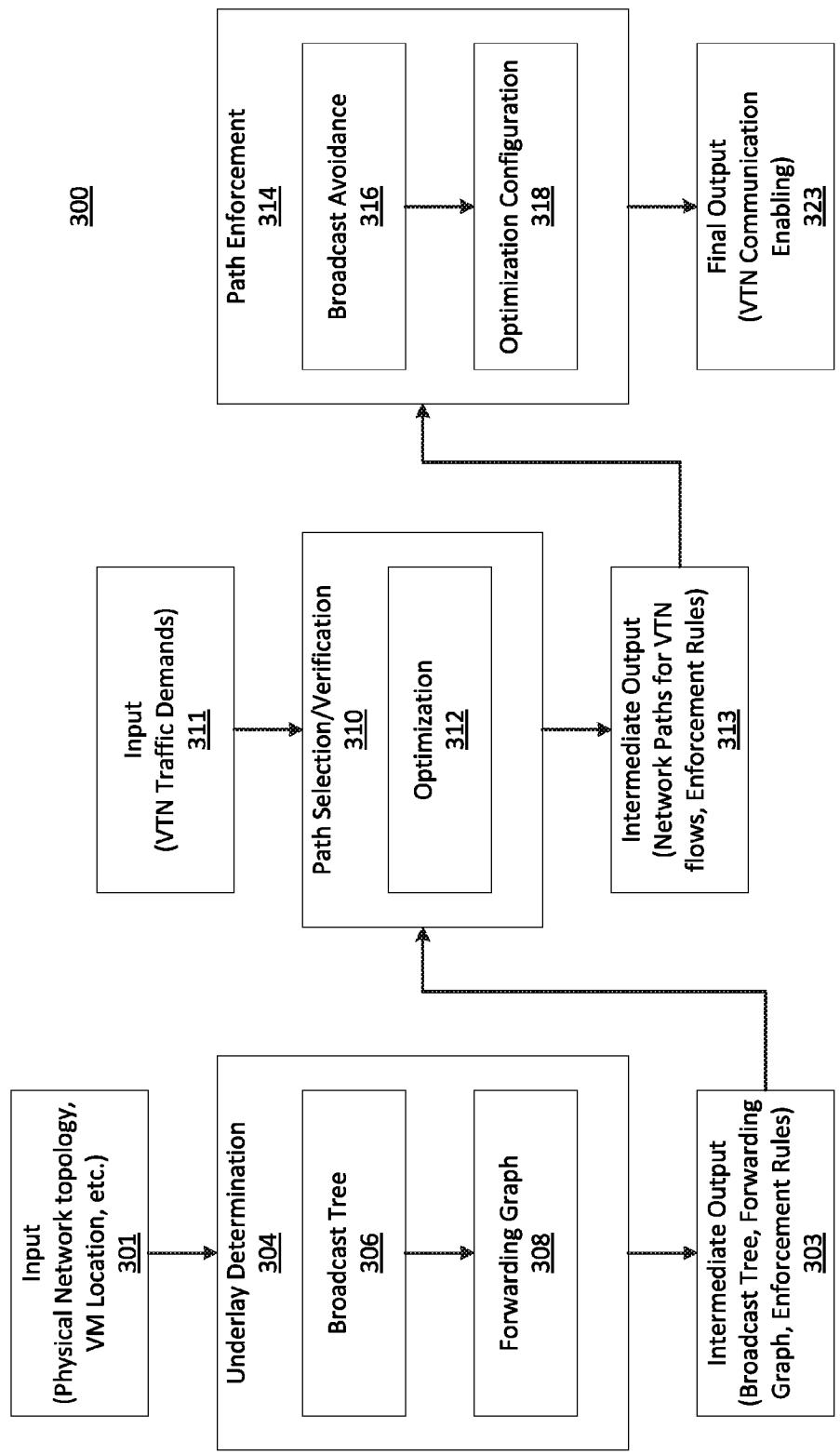
FIG. 3 shows an exemplary method for controlling switch routing in hybrid networks, in accordance with an embodiment of the present principles.
Figure 4:
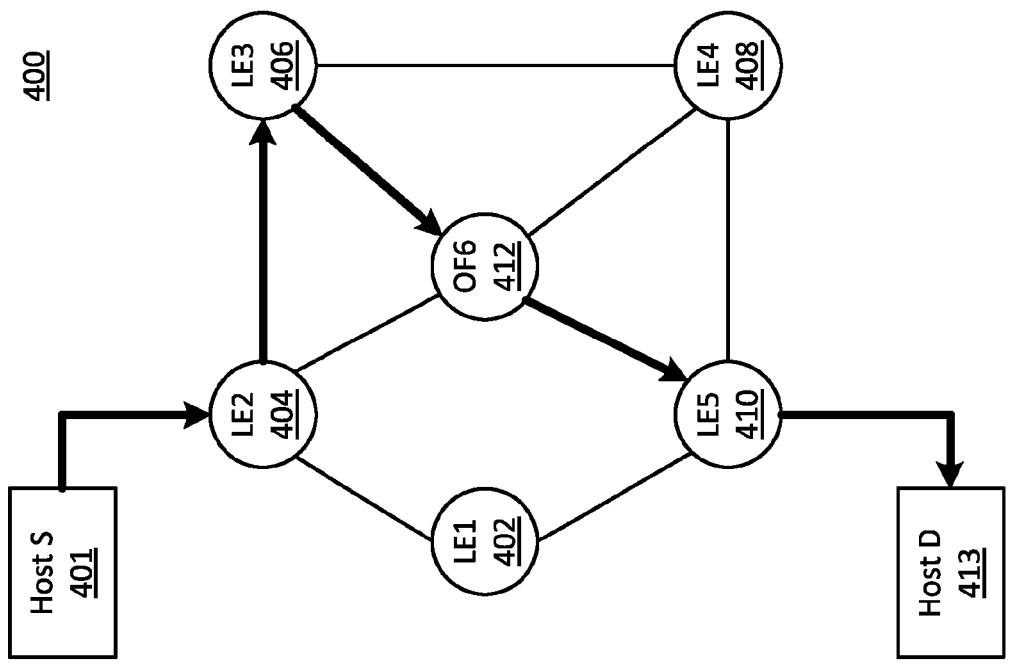
FIG. 4 shows an exemplary system/method illustratively depicting an initial network path and an updated network path in a hybrid network, in accordance with an embodiment of the present principles.
Figure 4:
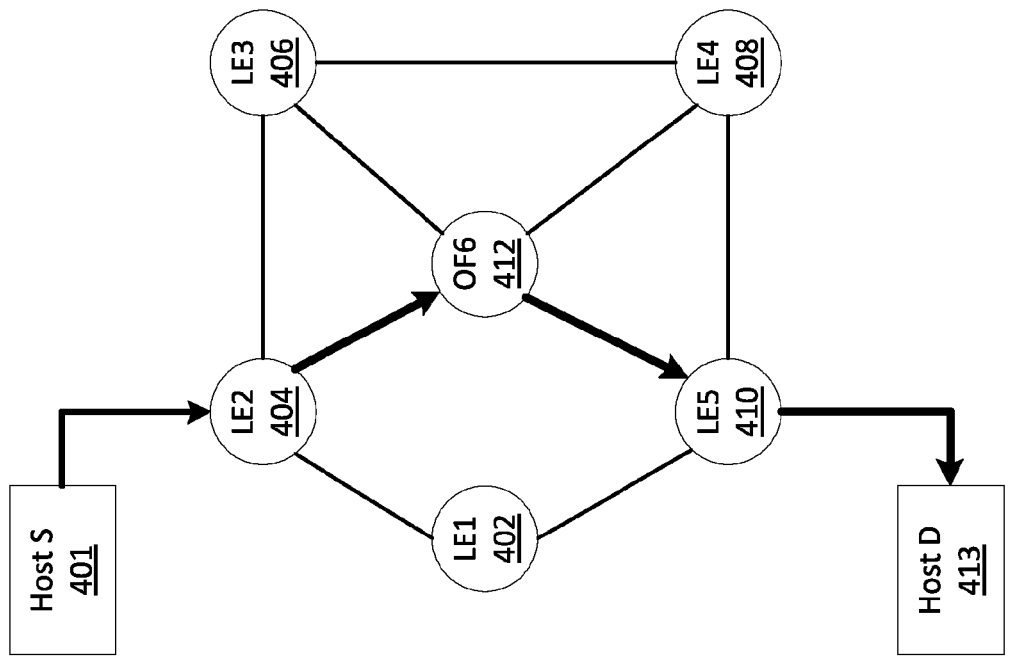

Further, it is to be appreciated that processing system 100 may perform at least part of the method described herein including, for example, at least part of methods 200, 300, 400, and 402 of FIGS. 2, 3, and 4, respectively. Similarly, part or all of systems 200, 400, 402, and 500 may be used to perform at least part of methods 200, 300, 400, and 402 of FIGS. 2, 3, and 4, respectively.

Referring now to FIG. 2, an exemplary high level system/method 200 for network path updating is illustratively depicted in accordance with an embodiment of the present principles. In an embodiment, for illustrative purposes, the present principles will be described in terms of a layer 2 hybrid network with both programmable and legacy switches. The programmable switches may be controlled using various methods (e.g., OpenFlow™), but conventional systems and methods cannot update legacy switch forwarding entries. A forward entry may include a destination MAC address m and an action (e.g., "send to port", "drop", etc.) to be applied to packets whose destination MAC is m. It may be assumed for this illustration that each legacy switch runs MAC learning, and that the legacy network is configured (either manually or automatically) to avoid routing loops (e.g., with STP). The collection of legacy links that results after this configuration may be referred to as the network underlay, and the network underlay may include a tree, or a plurality (e.g., collection) of trees.

In an embodiment, given an initial configured path P 202 (e.g., a sequence of switches between two hosts A 220 and B 230 attached to a hybrid network connected by one or more links 206), the present principles may be employed to control and enforce a new, updated path P' 204 by changing the path between A 220 and B 230 from P 202 to P' 204. In an embodiment, the initial configured path P 202 may use switches 201, 203, 205, 207, and 209, and the desired updated path P' 204 may use switches 201, 210, 203, 205, 207, 212, and 209 according to the present principles. In an embodiment, switches 201, 203, 205, 207, 209, 210, and 212 may be inter-connected to other switches and/or to the hosts 220, 230 by one or more links 206. In an embodiment, programmable switches may be controlled, and instructed to send special packets to the legacy switches on the new path, and these packets may take advantage of MAC learning to manipulate legacy switches into updating forwarding entries (e.g., a single forwarding entry) in their routing tables.

For example, in an embodiment, to modify the action of a routing entry for MAC m from "send to port p1" to "send to port p2", a special packet may be generated with a source address m, and this packet may be sent to the switch (e.g., switch 201) on port p2. The MAC learning method recognizes the packet arriving on p2 and may assume its source address m is reachable on p2, therefore updating the corresponding forwarding entry. In an embodiment, updating P 202 to P' 204 may be performed by updating all switches on P' 204 but not on P 202, and updating all switches where the two paths diverge and converge. For example, all switches may be updated except switch 205 because the path to and/or from switch 205 are not currently being updated. It is noted that an update subpath is sequence of adjacent switches that may be updated during a path change. In FIG. 2, switches 201, 210, and 203, and switches 207, 212, and 209 represent subpaths according to an embodiment of the present principles.

In an embodiment, all special packets (e.g., including link information, SNMP, ping information, etc.) that are employed to remotely manipulate a legacy switch's forwarding table arrive at the switch on a link that is part of the new path P' 204 that is to be installed. This may lead to two conditions that a path P' may satisfy before it may be enforced. In an embodiment, the first condition is that all legacy links on path P' 204 (e.g., links that have at least one legacy switch as endpoint) may be either part of the legacy layer 2 network underlay (e.g., the spanning tree) or adjacent to a programmable (e.g., OpenFlow switch, switch 210). This ensures that each legacy link on path P' 204 is reachable from a programmable switch 206. In an embodiment, the second condition may be that be that each update subpath of P' may include at least one programmable switch 210, as the programmable switch 210 may be employed to send a special packet that reaches a switch on the update subpath through a link part of path P' 204, even if the update subpath is part of the layer 2 underlay according to the present principles.

Referring now to FIG. 3, an exemplary method 300 for controlling switch routing in hybrid networks is illustratively depicted in accordance with an embodiment of the present principles. In an embodiment, input data may be received in block 301, and the input data may include physical network topology data, virtual machine (VM) locations, etc.) according to the present principles. The input data 301 may be employed for network underlay determination (computation) in block 304.

In an embodiment, the network underlay determination in block 304 may include determining two subgraphs: a broadcast tree graph 306, and a forwarding graph 308 according to the present principles. In an embodiment, the broadcast tree 306 may include the set of links that can be used for sending broadcast packets. The forwarding graph 308 may be the set of links used for sending both unicast and broadcast packets. The broadcast tree 306 may be a subset of the forwarding graph. By determining both a broadcast tree 306 and a forwarding graph 308, the present principles may be employed to separate learning for forwarding. Conventionally, layer 2 networks run a spanning tree detection algorithm to compute the set of feasible paths that could be used both for forwarding unicast and broadcast and turn off all links not part of this set. However, this limits the paths available for communication and puts additional stress on the chosen links. By separating the links that can be used for broadcast from those that can be used only for unicast according to the present principles, the number of paths available for communication are increased in relation to conventional systems and methods.

In an embodiment, a broadcast tree for a given network (e.g., Virtual Terminal Network (VTN) may be determined in block 306, and may be employed for sending broadcast packets (e.g., generated by switches, end hosts, etc.) according to the present principles.

In an embodiment, the setup cost is the cost incurred to set up the link as part of the VTN virtual topology and reflects the costs incurred to configure the two switches to which the link is incident. For illustrative purposes, two types of switches are considered in this example network: programmable and legacy. Configuring a programmable switch (e.g., Open-Flow™) to forward traffic for a VTN may include adding forwarding rules for VTN traffic to a switch. Configuring a legacy switch may include configuring the VLAN associated with the VTN, and the legacy switch may learn forwarding rules automatically according to various embodiments.

In an embodiment, to set the setup cost of a link during broadcast tree determination in block 304, the switches a particular link is incident to are updated. For example, for each programmable switch, one or more forwarding entries may be changed using a particular protocol (e.g., OpenFlow™), and for each legacy switch, a new VLAN may be defined. Generally the cost of updating forwarding entries on an OpenFlow switch is lower than the cost of setting up a VLAN on a legacy switch. It is noted that a1 and a5 represent measures of the setup cost (e.g., configuration cost of updating each switch). For each programmable switch, a1 may be added, and for each legacy switch, a5 may be added, where the values of a1 and a5 depend on the exact type of switch, and generally a1 is less than a5. It is noted that a1 and a5 represent a configuration cost of updating each switch In an embodiment, a location cost of a link represents how close a link is to the location of the hosts (e.g., VM machines) for which it provides communication. To determine the location cost of a link, the adjacent switches may be checked, and a3 may be added for each switch directly connected to a server where the VTN has a VM (e.g., a3=0.5). It is noted that a3 represents the value of the location cost of a link. Similarly to a1 and a5, a3 does not have a unit, as the unit does not matter as long as all three costs are normalized (e.g., between 0 and 1). To give more importance to one type of cost, weights w1, w2, and/or w3 may be employed according to the present principles.

In an embodiment, the final cost of each link may be determined by the following method:

$$Cost(link)=w1*setup(link)+w2*operation(link)+w3*location(link),$$

where w1, w2, and w3 are weights that may determine the importance of each of the topes of costs in determining the overall cost of the link. The values of w1, w2, and w3 may be varied to determine different cost distributions for the links in the network, and may therefore be employed to determine a plurality of minimum spanning trees during broadcast tree determination in block 306 according to an embodiment of the present principles.

In an embodiment, the underlay determination in block 304 may include determining multiple minimum spanning trees for the graph corresponding to the physical topology and selecting the "best" one as the broadcast tree (where "best" is defined according to several cost metrics, as described below). Because a graph may include a single minimum spanning tree (assuming all link costs are different), a plurality of spanning trees may be generated by changing the way that the cost of each link is determined. The costs considered may include, for example, setup costs, operational costs, and/or location costs.

In an embodiment, after determining the set of possible MSTs, an optimal one may be selected in block 306 according to the requested VTN demand and/or one or more of the following five cost-benefit metrics: (1) average hop count, which may include an average number of switch hops for all VM-to-VM pairs in a VTN, (2) average setup costs, which may include average setup time for all switches that will be configured, (3) average path utilization, which may include average utilization for all VM-to-VM paths, (4) average bandwidth delay product, which may include a product of path utilization and a number of switch hops for all VM-to-VM paths, and (5) average number of VTNs/links, which may include an average number of VTNs for all links which carry traffic for at least one VTN (this metric applies when there are multiple VTNs embedded in a network). It is noted that although the above metrics are described above, it is contemplated that any network metrics may be employed in block 306 according to various embodiments of the present principles.

In an embodiment, the broadcast tree(s) determined in block 306 may include a set of links that can transmit broadcast packets. In a legacy network (because the switches cannot be conventionally controlled), the only way to stop broadcast on a link is to turn the link off completely. However, a side effect of this action is that the link cannot be used for unicast traffic either. The present principles may be employed to control where packets are forwarded using programmable switches. With programmable switches, broadcast may be stopped while allowing unicast by installing specific rules in the forwarding table for a particular programmable switch.

In block 308, one or more forwarding graphs may be determined/constructed, and the forward graph may correspond to a physical network topology. The construction of the forwarding graph in block 308 may receive the broadcast tree from block 306 as input, and may add all links that are adjacent to a programmable switch. In an embodiment, broadcast may be controlled on these links by installing rules in the forwarding table of a programmable switch at either end of the link, and to allow unicast freely, thus increasing the diversity of paths available between two hosts as compared with conventional systems and methods. In some embodiments, forwarding tree graphs may be constructed in block 308 by constructing forwarding graphs for all trees determined in block 306 according to the present principles.

In an embodiment, intermediate output 303 (e.g., broadcast tree, forwarding graph, enforcement rules, etc.), and VTN traffic demands 311 may be employed as input for path selection/verification in block 310. In block 312, optimization may be performed to determine the optimal path between two hoses on the forwarding graph determined in block 308 according to the present principles.

In an illustrative example, the optimization in block 312 may employ Unsplittable Flow Problem (UFP) optimization, which is a special case of the multi-commodity flow problem, to determine the optima path but other optimization methods may also be employed according to the present principles. In an embodiment, UFP may employ VTN traffic demands as an input, and may map each VTN flow (e.g., VM-to-VM communication) to a path in the topology so that one or more constraints are met. In some embodiments, the constraints may include capacity constraints (e.g., the total demand of flows on a link does not exceed the link capacity), flow conservation (e.g., the total demand of flows entering a node equals to total demand of flows exiting a node), and demand satisfaction (e.g., the total demand of a flow is satisfied by the path it is mapped to), but other constraints may also be employed according to the present principles.

In an embodiment, the optimization in block 312 may be employed to determine a minimum cost mapping, where the cost of a mapping is the sum of each link cost. The link cost captures the cost of sending a flow over the link, and may depend on the setup cost of the link (e.g., one-time cost, when the VTN is mapped) and the cost of operating the link. The link cost used in the optimization may be different from the link cost employed to determine the minimum spanning tree during the underlay determination in block 304, as VTN demands are being considered during optimization in block 212.

In an illustrative example, during optimization in block 312, a variable (e.g., w4) may denote the operator or customer preference for faster configuration or for faster operation. If faster configuration is preferred, then the setup cost is more important and the optimization in block 312 may be employed to find paths with low setup cost (e.g., with fewer legacy switches). Otherwise, if faster operation is preferred, then the optimization in block 312 determines faster paths (e.g., in terms of available bandwidth). The cost of a link may be determined using the following method:

$$\text{Cost(link)} = (w4 * \text{setup(link)})/((1-w4) * \text{operation(link)}) * f\_i(\text{link}), \text{ if } w4!=0 \text{ and } w4!=1$$

$$\text{Cost(link)} = w4 * \text{setup(link)} * f\_i(\text{link}), \text{ if } w4=1$$

$$\text{Cost(link)} = 1/((1-w4) * \text{operation(link)}) * f\_i(\text{link}),$$

where $F_{\_i}(\text{link})$ represents the demand of VM pair i through the link according to the present principles.

In an embodiment, path verification may be performed during path selection in block 310. In an illustrative example, given an updated path P' and a current network configuration, path verification in block 310 may determine whether P' is feasible in a particular network. The path verification in block 310 may first verify that all legacy links on path P' are part of the legacy layer 2 network underlay or adjacent to a programmable switch. Next, the present principles may be employed to verify whether at least one switch is programmable (e.g., OpenFlow™enabled). If these conditions are verified, the forwarding entries in one or more programmable switches (e.g., for subpaths starting or ending with at least one programmable switch) are updated, or a programmable switch is used to send a message (e.g., LegacyFlowMod) message (e.g., for legacy link portion of the underlay).

In an embodiment, the path verification in block 310 may be performed according to the following method to verify the feasibility of a path:

---
Path Verification Method:

```
 1: for x_k --P'--> y_k do
 2:   for each legacy link e_i^LE do
 3:     if e_i^LE not in the underlay and e_i^LE contains only legacy
          switches then
 4:       return P' is infeasible
 5:     end if
 6:   end for
 7:   tag ← 0
 8:   for each switch n_i do
 9:     if n_i is OpenFlow enabled then
10:       tag ← 1
11:       break
12:     end if
13:   end for
14:   if tag = 0 then
15:     return P' is infeasible
16:   end if
17: end for
18: return P' is feasible
```
---

In an embodiment, to support forwarding entry updates on legacy switches, the path selection in block 310 may include path updating, and updated paths may be output in block 313 to be used as input for path enforcement in block 313. In an embodiment, a new primitive (e.g., LegacyFlowMod) may be introduced to generated and send special packets to the switch that is to be controlled according to the present principles. A rule that may be enforced on the header of these packets is that their source MAC address should be the same as the MAC associated with the forwarding entry that is to be adjusted. However, to limit side-effects to the network, ARP packets may be employed (as ARP packets only update ARP caches in local hosts and switches.

In an embodiment, to send a special packet, functionality of a programmable switch (e.g., OpenFlow™ PacketOut functionality), which enables the use of any programmable switch being controlled to insert a packet on a particular data plane, may be employed according to the present principles. In an embodiment, the path update in block 310 may be performed according to the following method:

---
Path Update Method:

```
 1: for x_k --P'--> y_k do
 2:   tag ← 0
 3:   for each switch n_i do
 4:     if n_i is OpenFlow enabled then
 5:       add forwarding rules in n_i for P'
 6:       if tag = 0 then
 7:         call LegacyFlowMod to send special packets
 8:         tag ← 1
 9:       end if
10:     end if
11:   end for
12: end for
```
---

In an embodiment, the paths determined in blocks 304 and 311 may be installed/enforced by path enforcement in block 314 according to the present principles. The path enforcement in block 314 may receive input from block 313, and may include broadcast avoidance in block 316 and/or optimization configuration in block 318 according to the present principles.

In block 316, broadcast avoidance may be performed by ensuring that all loops in a network include at least one programmable switch. All links in the physical network that are not part of the forwarding graph determined in block 308 may be turned off according to some embodiments. In an embodiment, all such links are between legacy switches and may be brought down using, for example, SNMP, as most legacy switches are SNMP enabled.

In block 318, optimization configuration may be performed by configuring paths according to the optimization performed in block 312 according to an embodiment. For programmable switches, corresponding rules may be installed in their forwarding tables, and for legacy switches, mappings (e.g., VLAN mappings) may be added to ports that are in the forwarding graph determined in block 308. In an embodiment, the optimization may include priming the network when optimization rules are installed in block 318. Using the programmable switches capability of sending packets into a network and the legacy switches capability of learning forwarding entries in real-time, a dummy packet may be generated to enable a legacy switch to follow a different path. In an embodiment, output from block 314 may be employed to enable VTN communication along a new path in block 323 according to the present principles.

For example, assuming a flow between legacy switches D and B has been mapped on the path D-F-B, where F is a programmable switch, the switch D may not know to forward the flow to F rather than another legacy switch C. Conventional systems and methods would broadcast the first packet of the flow on all ports and it would eventually receive a reply from switch C telling it that it can reach B through C. Note that D does not receive a similar reply from F since the present principles have ensured that broadcast is not propagated on the link F-B.

To prevent occurrences such as the above in a network, the network may be primed when installing optimization rules from block 313 during optimization configuration in block 318. Using a programmable switches capability of sending packets into a network and the legacy switches capability of learning forwarding entries in real-time, the present principles may make switch D believe that it can reach switch B through programmable switch F. To achieve this, a dummy packet with source B and destination D may be generated at programmable switch F in block 318. In an embodiment, the dummy packet may be sent to switch D using, for example, a PacketOut OpenFlow™ message according to the present principles. When switch D receives the dummy packet on its link to switch F, it may view the source as switch B and may then record its own forwarding table including a path reaching switch B through switch F according to various embodiments.

Referring now to FIG. 4, an exemplary system/method 400 showing an initial network path in the left diagram and an updated network path in the right diagram in a hybrid network is illustratively depicted in accordance with an embodiment of the present principles. In an embodiment, an initial path (represented by a bolded path) between host S 401 and Host D 413 is illustratively depicted for a hybrid network. In this illustrative example, legacy switches 402, 404, 406, 408, and 410 may be included in the network topology, and a programmable switch 412 may also be included in the network topology. In an embodiment, an updated path may be determined and the present principles may be employed to control transmission over the updated path.

In an illustrative embodiment, the path between host S 401 and host D 413 initially includes switches 404, 412, and 410, and a desired updated path may include switches 404, 406, 412, and 410. To achieve this update, the forwarding entries on switch 404 may be changed (e.g., to forward packets for host D 413 to switch 406 rather than to switch 412), and the forwarding entries on switch 406 may be changed (e.g., to forward packets for host D 413 to switch 412 rather than to switch 404).

In an embodiment, the present principles may be employed to control/send special packets from programmable switch 412 to legacy switch 406 using a function (e.g., LegacyFlowMod). The packets may include the address of host D 405 as their source MAC address, and may trigger the learning method on switches 404 and 406 to update their forwarding tables according to the incoming interfaces. When updating a path, the reverse path may be automatically updated in some embodiments. For simplicity of illustration, details of the reverse path change is not described, but it may be performed similarly to the forward path change according to various embodiments.

In the example network shown in FIG. 4, as the subpath including switches 404, 406, and 412 starts or ends with a programmable switch (e.g., 412), the forwarding entry may be updated in switch 412 to redirect traffic from host D 405 to host S 401 on the link including switches 406 and 412. In an embodiment, switch 404 may then change the forwarding entry to forward future packets for host D 405 to switch 406 after it receives one or more data packets from switch 406. It is noted that although the above network configuration is shown with a limited number of switches, hosts, and paths for simplicity of illustration, any number of switches, hosts, and paths may be employed according to various embodiments of the present principles.

Figure 5:
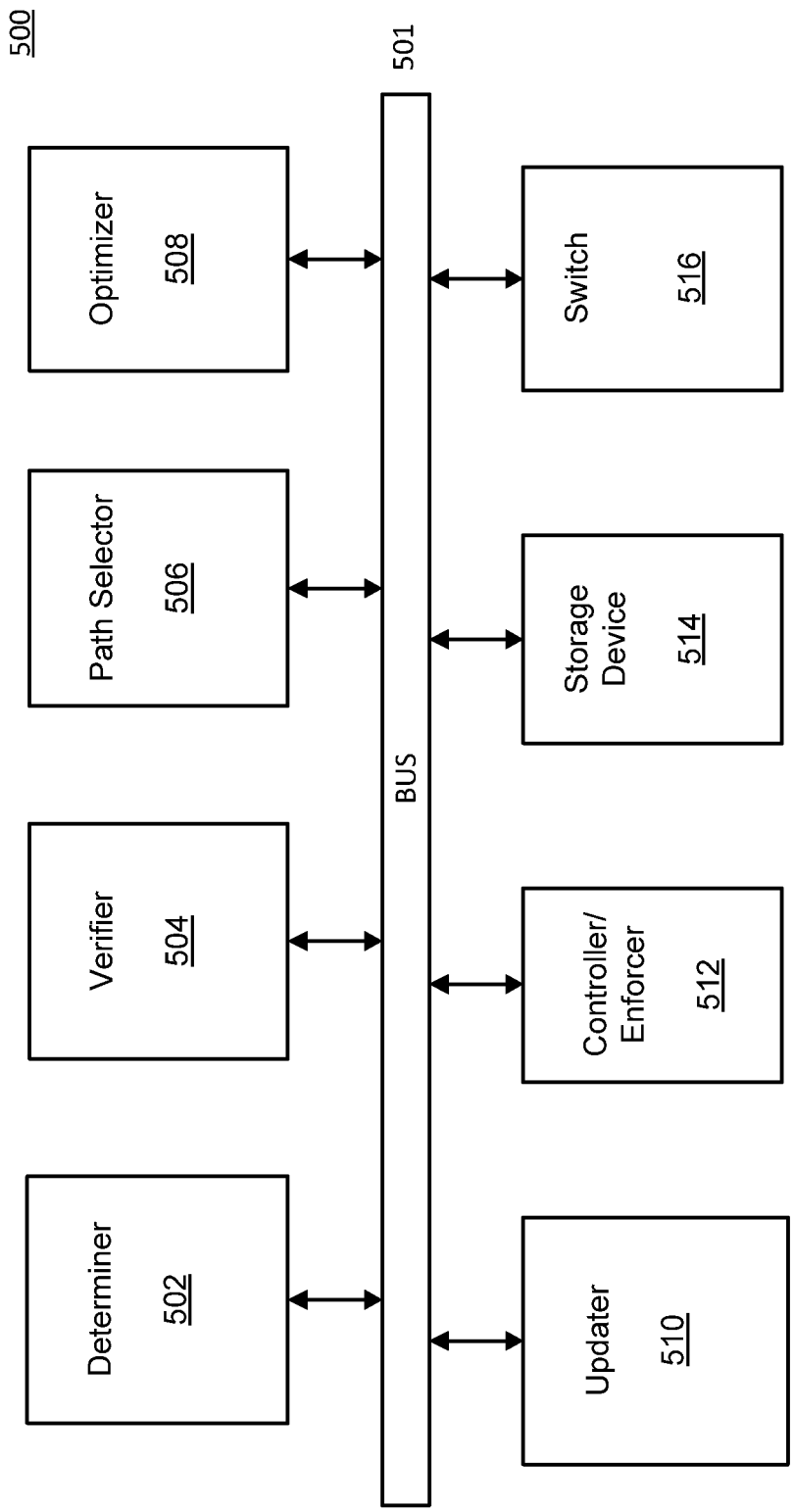
FIG. 5 shows an exemplary system for controlling switch routing in hybrid networks, in accordance with an embodiment of the present principles.

Referring now to FIG. 5, an exemplary system 500 for controlling switch routing in hybrid networks is illustratively depicted in accordance with an embodiment of the present principles. A controller 512 may be connected to a bus 501, and may be employed to control all or part of methods 200, 300, and/or 400 in FIGS. 2, 3, and 4, respectively, in addition to controlling systems 100, 300, 400, and/or 500 in FIGS. 2, 3, 4, and 5, respectively, according to various embodiments of the present principles. In some embodiments, the controller 512 may be a hardware logic circuit according to the present principles.

While many aspects of system 500 are described in singular form for the sakes of illustration and clarity, the same can be applied to multiples ones of the items mentioned with respect to the description of system 500. For example, while a single switch 516 is described, more than one switch 516 can be used in accordance with the teachings of the present principles, while maintaining the spirit of the present principles. Moreover, it is appreciated that the switch 516 is but one aspect involved with system 500 than can be extended to plural form while maintaining the spirit of the present principles.

The system 500 can include a determiner 502, a verifier 504, a path selector 506, an optimizer 508, an updater 510, a controller/enforcer 512, a storage device 514, and/or a switch 516 according to various embodiments of the present principles.

In an embodiment, the determiner 502 may be employed for underlay network determination, broadcast tree determination, and/or forwarding graph determination according to the present principles, and the results may be stored in a storage device 514. Output from the determiner 502 may be employed as input to a verifier 504 (e.g., to verify feasibility of potential paths) and/or a path selector 506 (e.g., to select a particular path) according to an embodiment. An optimizer 508 may be employed for optimization of paths (as described above), and the paths may be updated using an updater 510 according to the present principles. Updated paths generated by the updater 510 may be selected and enforced by a controller/enforcer 512 for application of the new path to one or more networks according to various embodiments of the present principles.

In the embodiment shown in FIG. 5, the elements thereof are interconnected by a bus 501. However, in other embodiments, other types of connections can also be used. Moreover, in an embodiment, at least one of the elements of system 500 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 400 are readily determined by one of ordinary skill in the art, given the teachings of the present principles provided herein, while maintaining the spirit of the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A computer implemented method for controlling legacy switch routing in one or more hybrid networks of interconnected computers and switches, comprising:

generating a network underlay for the one or more hybrid networks by generating a minimum spanning tree (MST) and a forwarding graph (FWG) over a physical network topology of the one or more hybrid networks;

determining an optimal path between hosts on the FWG by optimizing an initial path with a minimum cost mapping; and adjusting the initial path to enforce the optimal path by generating and installing special packets in one or more programmable switches to trigger installation of forwarding rules in one or more legacy switches.

2. The method of claim 1, wherein the MST includes a set of links for sending broadcast packets between switches in the one or more hybrid networks.

3. The method of claim 1, wherein the FWG includes a set of links for sending both unicast and broadcast packets between switches in the one or more hybrid networks.

4. The method of claim 1, wherein the adjusting the initial path further comprises:
turning off physical links not in the FWG;
installing rules on the programmable switches to drop broadcast traffic on all links that are in the FWG but not in the MST; and
forwarding traffic along the optimal path.

5. The method of claim 1, wherein the minimum cost mapping is a sum of each link costs, wherein the link costs include a cost of sending a flow over a link, setup costs of the link, a cost of operating the link, and a cost of a plurality of network demands.

6. The method of claim 1, further comprising avoiding broadcast by verifying that all loops in the hybrid network include at least one programmable switch.

7. The method of claim 1, wherein the special packets are continually sent and installed in the legacy switches until the legacy switches reach a stable state, wherein the stable state is reached when data packets traverse the optimal path in both directions.

8. A system for controlling legacy switch routing in one or more hybrid networks of interconnected computers and switches, comprising:
a network underlay generator to construct a minimum spanning tree (MST) and a forwarding graph (FWG) over a physical network topology of the one or more hybrid networks;
an optimizer to determine an optimal path between hosts on the FWG by optimizing an initial path with a minimum cost mapping; and
a controller to enforce the optimal path by generating and installing special packets in one or more programmable switches to trigger installation of forwarding rules for one or more legacy switches.

9. The system of claim 8, wherein the MST includes a set of links to send broadcast packets between switches in the one or more hybrid networks.

10. The system of claim 8, wherein the FWG includes a set of links to send both unicast and broadcast packets between switches in the one or more hybrid networks.

11. The system of claim 8, wherein the adjusting the initial path further comprises:
turning off physical links not in the FWG;
installing rules on the programmable switches to drop broadcast traffic on all links that are in the FWG but not in the MST; and
forwarding traffic along the optimal path.

12. The system of claim 8, wherein the minimum cost mapping is a sum of each link costs, wherein the link costs include a cost of sending a flow over a link, setup costs of the link, a cost of operating the link, and a cost of a plurality of network demands.

13. The system of claim 8, further comprising avoiding broadcast by verifying that all loops in the hybrid network include at least one programmable switch.

14. The system of claim 8, wherein the special packets are continually sent and installed in the legacy switches until the legacy switches reach a stable state, wherein the stable state is reached when data packets traverse the optimal path in both directions.

15. Non-transitory storage medium comprising a a set of instructions which when executed on a computer causes the computer to perform the steps of:
generating a network underlay for one or more hybrid networks of interconnected computers and switches by generating a minimum spanning tree (MST) and a forwarding graph (FWG) over a physical network topology of the one or more hybrid networks;
determining an optimal path between hosts on the FWG by optimizing an initial path with a minimum cost mapping; and
adjusting the initial path to enforce the optimal path by generating and installing special packets in one or more programmable switches to trigger installation of forwarding rules for one or more legacy switches.

16. The non-transitory storage medium of claim 15, wherein the MST includes a set of links for sending broadcast packets between switches in the one or more hybrid networks.

17. The non-transitory storage medium of claim 15, wherein the FWG includes a set of links for sending both unicast and broadcast packets between switches in the one or more hybrid networks.

18. The non-transitory storage medium of claim 15, wherein the adjusting the initial path further comprises:
turning off physical links not in the FWG;
installing rules on the programmable switches to drop broadcast traffic on all links that are in the FWG but not in the MST; and
forwarding traffic along the optimal path.

19. The non-transitory storage medium of claim 15, wherein the minimum cost mapping is a sum of each link costs, wherein the link costs include a cost of sending a flow over a link, setup costs of the link, a cost of operating the link, and a cost of a plurality of network demands.

20. The non-transitory storage medium of claim 15, further comprising avoiding broadcast by verifying that all loops in the hybrid network include at least one programmable switch.

* * * * *